United States Patent [19]

McCracken et al.

[11] Patent Number: 5,589,891

[45] Date of Patent: Dec. 31, 1996

[54] VIDEO SYNCHRONIZED POWER MODULE

[75] Inventors: William P. McCracken, Garland; Neal Cooper, Coppell, both of Tex.

[73] Assignee: Texas Instruments Incorporated, Dallas, Tex.

[21] Appl. No.: 245,382

[22] Filed: May 17, 1994

[51] Int. Cl.$^6$ ................................................ H04N 5/63
[52] U.S. Cl. ........................... 348/730; 348/540; 348/543; 348/504; 348/509
[58] Field of Search ........................................ 348/730, 479, 348/540, 543, 504, 509; 363/49, 22, 23, 273, 97, 133, 134, 24, 25, 26; H04N 5/63

[56] References Cited

U.S. PATENT DOCUMENTS

| | | | |
|---|---|---|---|
| 4,103,356 | 7/1978 | Finlay | 363/22 |
| 4,460,951 | 7/1984 | Fenter et al. | 363/49 |
| 4,905,136 | 2/1990 | Tanaka | 363/124 |

OTHER PUBLICATIONS

Installation, operation, and Maintenance manual for 4810 Series Solid–State CCD Cameras, Technical Manual, Code No. 6X–846, Cohu, Inc., Electronics Division, San Diego, California, Feb. 16, 1987.

*Primary Examiner*—John K. Peng
*Assistant Examiner*—Nina M. West
*Attorney, Agent, or Firm*—Alan K. Stewart; Richard L. Donaldson; William E. Hiller

[57] ABSTRACT

The synchronized transformer-coupled power supply circuit includes a transformer 20; an input power signal coupled to a primary winding 22 of the transformer 20; voltage regulators 48–53 coupled to secondary windings 24 and 26 of the transformer 20; and a start-up circuit 10 for coupling the input power signal directly to one of the voltage regulators 48–51 until the transformer 20 reaches a desired operating level.

18 Claims, 2 Drawing Sheets

VIDEO SYNCHRONIZED POWER MODULE

FIELD OF THE INVENTION

This invention generally relates to electronic circuits and in particular it relates to regulated power supplies.

BACKGROUND OF THE INVENTION

All electronic imaging products must achieve and maintain a level of picture quality which is acceptable to the user. One important aspect of picture quality is the signal-to-noise ratio (SNR) which is a measure of video signal amplitude versus any unwanted noise signal amplitude. The human vision system is sensitive to most electronic noise which can be introduced into the video signal. This noise most often has a repetitive nature which is sometimes synchronized with the video information being displayed and at other times can be non-synchronous which causes it to move or roll with respect to the video. Therefore, a large SNR of 40 dB or greater is normally required for electronic imaging products.

One source of electronic noise is the power supply which provides the appropriate voltage levels required by the electronic components. The generation of multiple, different voltage levels from one common input voltage has been accomplished in numerous ways including switching transformer DC to DC converters. The draw back of these standard solutions is the unacceptable voltage ripple on the output voltage levels which are synchronized to the switching frequency that has been selected to optimize the voltage conversion. This switching frequency is usually an independently generated clocking signal which controls the power conversion operation and typically ranges from 100 Khz to 500 Khz. Since this switching frequency source is independent it will tend to beat with any other independent clocking frequency operating in the circuitry. The residual noise component due to the power converter clocking frequency can also be riding on top of the output voltages generated by such a power converter. In the prior art, additional filter components are added to reduce the remaining switching noise on the output voltage levels. These methods do help reduce the noise affects, but in video electronics it is almost impossible to eliminate this noise completely using additional filter components. This is due to many aspects such as human vision integrating the video information on a display which can distinguish very low levels of rolling, fixed pattern noise. Video electronics must maintain good signal to noise ratio and dynamic range to provide an optimum imaging system. This usually requires a large signal gain for low light conditions which tends to also magnify the noise sources present such as power supply ripple.

One prior art switching transformer DC to DC converter uses a single ended, switching regulator controller to form a flyback switching transfer circuit. This circuit is synchronized to the horizontal line rate and uses pulse width modulation to control the amount of time that current is conducted through the primary winding of a transformer. Output pulse modulation is accomplished by comparison of the positive saw tooth waveform to either of two control signals at the error amplifier inputs. This allows the error amplifiers a means to adjust the output pulse width from a maximum percent on-time down to zero percent. Modulation of the output pulse width controls the amount of current passing through the transformer's primary which determines the transformer's internal magnetic flux intensity and therefore controls the amplitude of the transformer's output voltage on its secondary windings.

The drawback of this approach is that it relies upon pulse width modulation of the primary current to control the transformer's output. This allows for on to off primary current transitions to occur during the active video display time and any resulting supply ripple can be amplified and show up as noise on the video display. This on to off transition point may also vary with respect to time as the pulse width is varied to compensate for a changing load requirement on the transformer's secondary. This could result in a moving, fixed pattern noise component on the video which is easily discernible to the observer.

Another drawback of the above described circuit is the unsymmetric nature of the flyback transformer configuration. This is because the primary winding actually conducts current in only one portion of the duty cycle of the pulse width modulated control signal. The remaining portion of the duty cycle that does not conduct current through the primary and control switch must rely upon the energy stored within the primary inductance to provide enough flux linkage to maintain the proper secondary voltage levels. This tends to lead to an unsymmetrical secondary voltage modulation that can vary in duration depending on the pulse width modulation of the control signal.

SUMMARY OF THE INVENTION

Generally, and in one form of the invention, a synchronized transformer-coupled power supply circuit includes a transformer; an input power signal coupled to a primary winding of the transformer; voltage regulators coupled to secondary windings of the transformer; and a start-up circuit for coupling the input power signal directly to one of the voltage regulators until the transformer reaches a desired operating level.

This invention provides several advantages. One advantage of this invention is that the switching noise from the switching transformer configuration is eliminated from the video image.

DETAILED DESCRIPTION OF PREFERRED EMBODIMENTS

Figure 1:
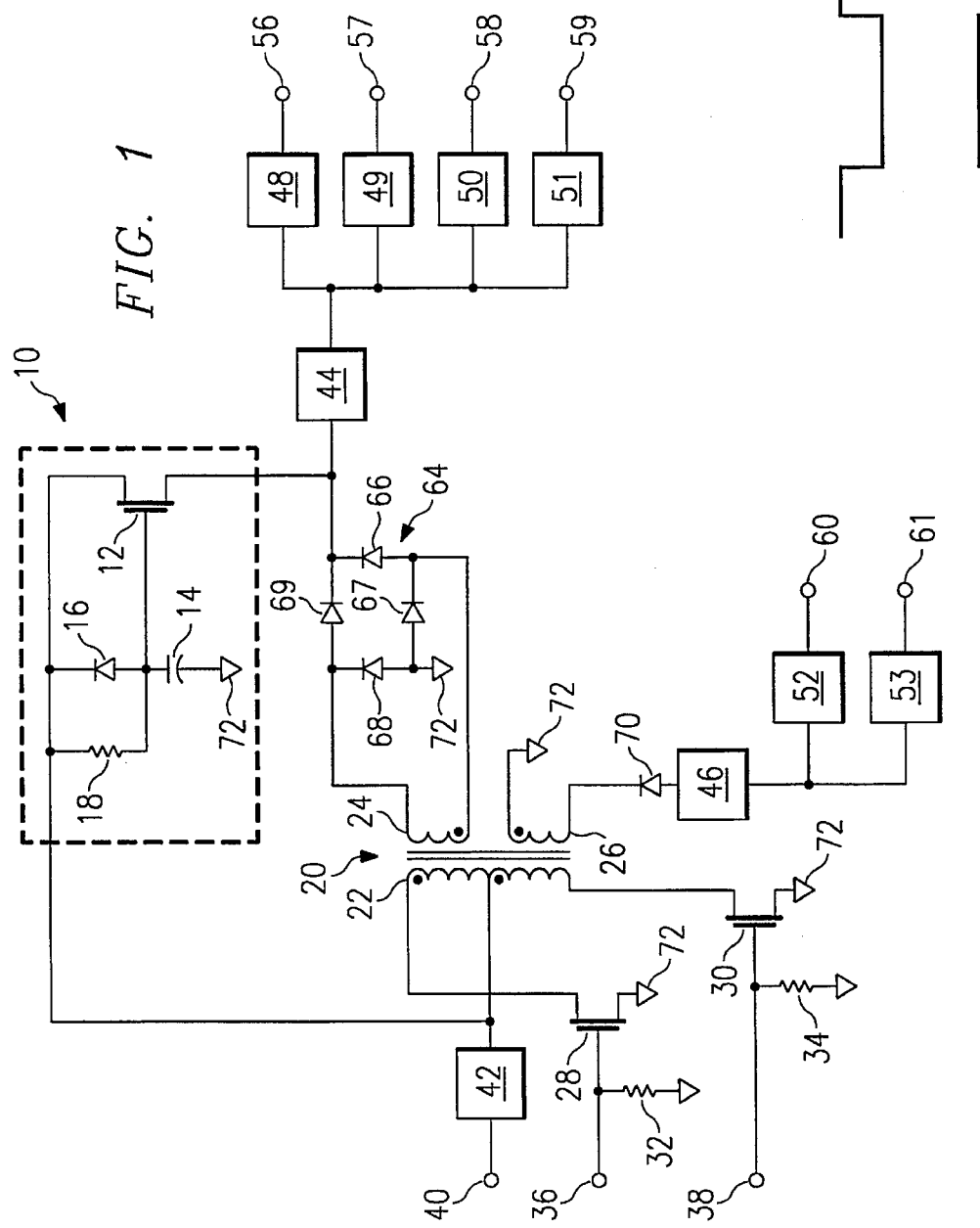
FIG. 1 is a schematic circuit diagram of a first preferred embodiment video synchronized power module according to the invention.
Figure 2:
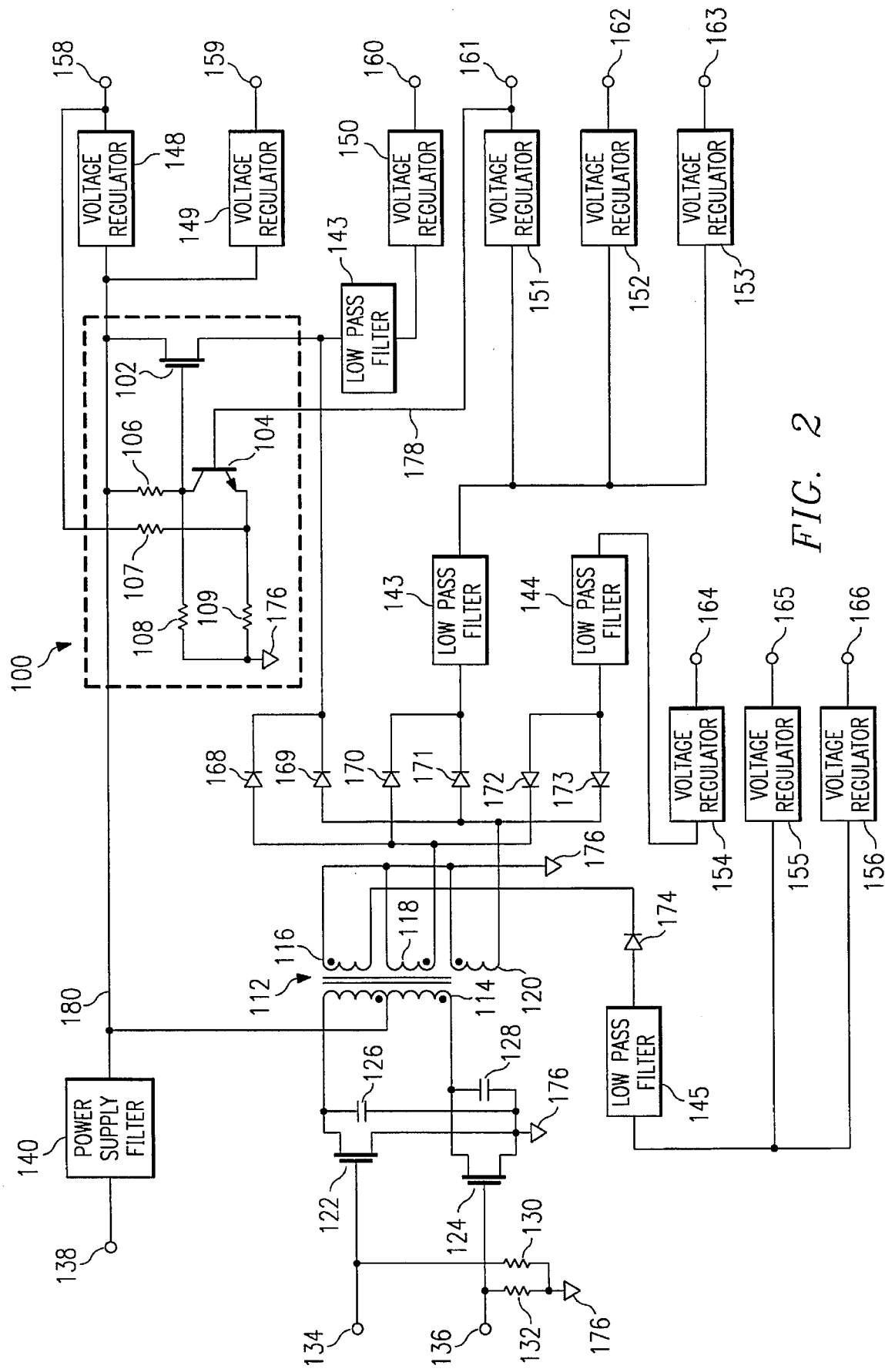
FIG. 2 is a schematic circuit diagram of a second preferred embodiment video synchronized power module according to the invention.

A circuit diagram of a first preferred embodiment video synchronized power module (VSPM) is shown in FIG. 1. A circuit diagram of a second preferred embodiment VSPM is shown in FIG. 2. These preferred embodiments eliminate the rolling, fixed pattern noise component of the prior art. An important feature of these embodiments is that the power converter switching frequency is synchronized with the horizontal line rate of a standard TV format. Any ripple remaining on the power converter's output will be present at the same point in time for each TV line. In the preferred embodiments, this ripple occurs only during the horizontal blanking interval when no video information is displayed on the monitor. Therefore, noise due to the power converter is not displayed in the real video image. These embodiments operate at a switching frequency of one half the video horizontal line rate. For a typical horizontal line rate of 15.75 Khz, the switching frequency is 7.875 Khz.

Unlike the pulse width modulation of the video synchronized circuit of the prior art, this circuit is configured as a push-pull transformer circuit which operates continuously at one half the video horizontal line rate. This ensures that current is always flowing through one half of the primary winding thereby providing a symmetrical load sustaining capability. The proper secondary voltage levels are maintained by designing a custom transformer which provides the desired output voltages at specified full-load currents. This eliminates the need for a pulse width modulator controller as required in the prior art. The new circuit maintains constant on/off and off/on switching transitions such that the transitions only occur during the horizontal blanking intervals. This is unlike the prior art design which allows transitions during the video time depending on the width of the control signal.

One problem encountered with a VSPM is the start-up condition since synchronized timing signals are required to begin the operation of the push-pull switching transformer circuit. This obstacle is overcome by a start-up circuit which allows the input supply voltage to be connected directly to the regulator responsible for generating the +5 volt logic supply voltage. This allows the timing circuits to begin functioning and supply the necessary synchronized timing signals to the switching transformer circuit. The input power supply is disconnected from the +5 volt logic regulator once the switching transformer circuit is operational and ready to supply all loads. This start-up circuit can be implemented a number of ways. The two preferred embodiments shown in FIGS. 1 and 2 provide examples of two start-up circuits.

Referring first to FIG. 1, a circuit diagram of a first preferred embodiment VSPM according to the invention is shown. The circuit includes start-up circuit 10 which includes transistor (start-up switch) 12, capacitor 14, diode 16, and resistor 18; transformer 20 which includes center-tapped primary 22, secondary 24, and secondary 26; switching transistor (switch) 28; switching transistor (switch) 30; resistor 32; resistor 34; switching transistor input node 36; switching transistor input node 38; power supply input node 40; power supply filter 42; low pass filters 44 and 46; voltage regulators 48–53; output nodes 56–61; rectifier circuit 64 which includes diodes 66–69; diode 70; and common node 72. Power supply node 40 is coupled to center-tapped primary 22 through power supply filter 42. Voltage regulators 48–51 are coupled to secondary winding 24 through low pass filter 44 and diodes 69 and 66. Voltage regulators 52 and 53 are coupled to secondary winding 26 through low pass filter 46 and diode 70. Start up circuit 10 couples the input power from node 40 directly to voltage regulators 48–51 through low pass filter 42. Switch 28 is coupled between the first end of primary winding 22 and common node 72. Switch 30 is coupled between the second end of primary winding 22 and common node 72. Start-up switch 12 is coupled between the input power on node 40 and voltage regulators 48–51. The first end of resistor 18 is coupled to the input power on node 40. The second end of resistor 18 is coupled to the control node of start-up switch 12. The first end of capacitor 14 is coupled to the second end of resistor 18. The second end of capacitor 14 is coupled to common node 72. The first end of diode 16 is coupled to the first end of resistor 18. The second end of diode 16 is coupled to the second end of resistor 18.

Table 1 itemizes the critical components of the first preferred embodiment shown in FIG. 1. As an illustration and not a limitation, the designations and electrical parameters are included.

TABLE I

| REFERENCE NUMBER | DESIGNATION | DESCRIPTION |
|---|---|---|
| 12 | Transistor | TP2502N8 |
| 14 | Capacitor | 1 µfd., 16 v |
| 16 | Diode | 1N4148 |
| 18 | Resistor | 1M ohm |
| 20 | Transformer | 12VTMR |
| 28 | Transistor | TN2510N8 |
| 30 | Transistor | TN2510N8 |
| 32 | Resistor | 10K ohm |
| 34 | Resistor | 10K ohm |
| 56 | Output | 12 v |
| 57 | Output | 12 v |
| 58 | Output | 2 v |
| 59 | Output | 6 v |
| 60 | Output | −11 v |
| 61 | Output | −7 v |

In the start-up circuit 10 of the first preferred embodiment, shown in FIG. 1, the input power from node 40 is connected to the voltage regulators 48–51 through MOS transistor 12. The circuit employs a simple time constant circuit (RC circuit) consisting of resistor 18 and capacitor 14 that will disconnect the input supply after a predetermined time has expired. This allows the transformer 20 time to begin operation including supplying the voltage regulators 48–51 as well as the remaining circuitry. A faster time constant for the turn-off transition is provided by the diode 16. The faster time constant for the turn-off transition is used to allow reliable on-off-on switching action.

Referring to FIG. 2, a circuit diagram of a second preferred embodiment VSPM according to the invention is shown. The circuit includes start-up circuit 100 which includes transistor (start-up switch) 102, transistor (feedback switch) 104, and resistors 106–109; transformer 112 which includes center-tapped primary 114, secondary 116, secondary 118, and secondary 120; switching transistor (switch) 122; switching transistor (switch) 124; capacitor 126; capacitor 128; resistor 130; resistor 132; switching transistor input node 134; switching transistor input node 136; power supply input node 138; power supply filter 140; low pass filters 142–145; voltage regulators 148–156; output nodes 158–166; diodes 168–174; and common node 176. Power supply node 138 is coupled to center-tapped primary 114 through power supply filter 140. Voltage regulators 151–156 are coupled to the secondary windings 116, 118, and 120 through low pass filters 142–145. Start up circuit 100 couples the input power on line 180 directly to voltage regulator 150 through low pass filter 142. Switch 122 is coupled between the first end of primary winding 114 and common node 176. Switch 124 is coupled between the second end of primary winding 114 and common node 176. Start-up switch 102 is coupled between the input power on line 180 and voltage regulator 150. Voltage regulators 148 and 149 are coupled directly to the input power on line 180. The first end of resistor 106 is coupled to the input power on line 180. The second end of resistor 106 is coupled to start-up switch 102. The first end of resistor 108 is coupled to the second end of resistor 106. The second end of resistor 108 is coupled to common node 176. The first end of resistor 107 is coupled to the output of voltage regulator 148. The first end of resistor 109 is coupled to the second end of resistor 107. The second end of resistor 109 is coupled to common node 176. Feedback switch 104 is coupled between the second end of resistor 106 and the second end of resistor 107. A first end of diodes 168–174 is coupled to a first end of one of the secondary windings 116, 118, and 120. The second ends of secondary windings 116, 118, and 120 are coupled to the common node 176. Start-up switch 102 is coupled between the input power on line 180 and the second ends of diodes 168 and 169. Voltage regulator 150 is coupled to the second end of diodes 168 and 169 through low pass filter 142. Voltage regulator 151 is coupled to the second end of diodes 170 and 171 through low pass filter 143.

Table 2 itemizes the critical components of the second preferred embodiment shown in FIG. 2. As an illustration and not a limitation, the designations and electrical parameters are included.

TABLE II

| REFERENCE NUMBER | DESIGNATION | DESCRIPTION |
|---|---|---|
| 102 | Transistor | TN2510N8 |
| 104 | Transistor | MMBT3904 |
| 106 | Resistor | 100K ohm |
| 107 | Resistor | 2K ohm |
| 108 | Resistor | 100K ohm |
| 109 | Resistor | 1K ohm |
| 112 | Transformer | Q2569-02 |
| 122 | Transistor | TN2510N8 |
| 124 | Transistor | TN2510N8 |
| 126 | Capacitor | .01 µfd. |
| 128 | Capacitor | .01 µfd. |
| 130 | Resistor | 100K ohm |
| 132 | Resistor | 100K ohm |
| 158 | Output | 12 v |
| 159 | Output | 5 v |
| 160 | Output | 5 v |
| 161 | Output | 5 v |
| 162 | Output | 2 v |
| 163 | Output | 6 v |
| 164 | Output | −5 v |
| 165 | Output | −11 v |
| 166 | Output | −7 v |
| 168 | Diode | MLL4002 |
| 169 | Diode | MLL4002 |
| 170 | Diode | MLL4002 |
| 171 | Diode | MLL4002 |
| 172 | Diode | MLL4002 |
| 173 | Diode | MLL4002 |
| 174 | Diode | MLL4002 |

In the start-up circuit 100 of the second preferred embodiment, shown in FIG. 2, the input power from node 138 is connected to voltage regulator 150 through MOS transistor 102. A feedback voltage on line 178 from the output of voltage regulator 151 is used to turn on bipolar transistor 104 when the output of voltage regulator 151 reaches a desired operating level. The turn on voltage for the bipolar transistor 104 is determined by the voltage divider circuit consisting of resistors 107 and 109. The input voltage to the voltage divider network is the output of voltage regulator 148. Voltage regulator 148 is connected directly to the input power on line 180. When transistor 104 is turned on, transistor 102 turns off which disconnects the input supply from the voltage regulator 150. The start up circuit 100 will remain off as long as the transformer maintains the desired operating level.

Figure 3:
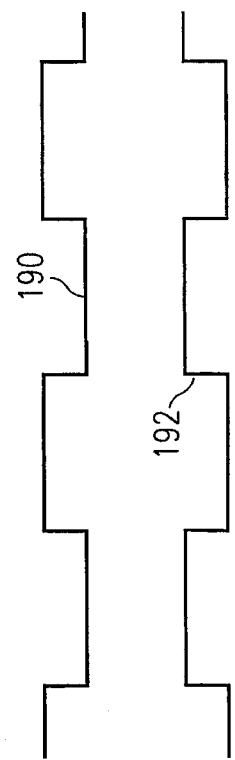
FIG. 3 is a waveform diagram of the input signals for the transistor switches which control the transformers in the first and second preferred embodiments.

FIG. 3 shows the input waveforms 190 and 192 for the switching transistor input nodes 36 and 38 in the first preferred embodiment, shown in FIG. 1, and for the switching transistor input nodes 134 and 136 for the second preferred embodiment, shown in FIG. 2. Waveform 190 is the input for node 36 and waveform 192 is the input for node 38 of the first preferred embodiment shown in FIG. 1. Waveform 190 is the input for node 134 and waveform 192 is the input for node 136 of the second preferred embodiment shown in FIG. 2. The frequency of the waveforms in FIG. 3 is one half of the video horizontal line rate. This frequency ensures that the switching always occurs during the horizontal blanking interval. This synchronization with the horizontal blanking interval eliminates switching noise in the video image.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A synchronized transformer-coupled power supply circuit comprising:

a transformer;

an input power signal coupled to a primary winding of the transformer;

voltage regulators coupled to secondary windings of the transformer;

a start-up circuit for coupling the input power signal directly to one of the voltage regulators; and a first switch coupled between a first end of the primary winding and a common node; and a second switch coupled between a second end of the primary winding and the common node, wherein the first switch and the second switch are synchronized to switch during video horizontal blanking periods.

2. A synchronized transformer-coupled power supply circuit comprising:

a transformer;

an input power signal coupled to a primary winding of the transformer;

voltage regulators coupled to secondary windings of the transformer;

a start-up circuit for coupling the input power signal directly to one of the voltage regulators, the start-up circuit comprises a start-up switch coupled between the input power signal and one of the voltage regulators, the start-up switch is controlled by a feedback circuit coupled between an output of one of the voltage regulators and the start-up switch.

3. The circuit of claim 2 wherein the start-up switch is a transistor.

4. The circuit of claim 2 wherein the start-up switch is a MOSFET.

5. The circuit of claim 2 wherein the start-up switch is controlled by an RC circuit.

6. The circuit of claim 5 wherein the RC circuit comprises:

a resistor, a first end of the resistor is coupled to the input power signal and a second end of the resistor is coupled to the start-up switch;

a capacitor, a first end of the capacitor is coupled to the second end of the resistor, and a second end of the capacitor is coupled to a common node; and a diode, a first end of the diode is coupled to the first end of the resistor and a second end of the diode is coupled to the second end of the resistor.

7. The circuit of claim 4 further comprising a direct voltage regulator coupled directly to the input power signal.

8. The circuit of claim 7 wherein the feedback circuit comprises:

a first resistor, a first end of the first resistor is coupled to the input power signal and a second end of the first resistor is coupled to the start-up switch;

a second resistor, a first end of the second resistor is coupled to the second end of the first resistor and a second end of the second resistor is coupled to a common node;

a third resistor, a first end of the third resistor is coupled to an output of the direct voltage regulator;

a fourth resistor, a first end of the fourth resistor is coupled to a second end of the third resistor and a second end of the fourth resistor is coupled to the common node; and a feedback switch coupled between the second end of the first resistor and the second end of the third resistor, the feedback switch is controlled by an output from another voltage regulator.

9. The circuit of claim 8 wherein the feedback switch is a transistor.

10. A video synchronized transformer-coupled power supply circuit comprising:

a transformer having a center-tapped primary winding and a secondary winding;

an input power signal coupled to a center of the primary winding;

a first switch coupled between a first end of the primary winding and a common node;

a second switch coupled between a second end of the primary winding and the common node;

a first diode, a first end of the first diode is coupled to a first end of the secondary winding and a second end of the secondary winding is coupled to the common node; and a start-up switch coupled between the input power signal and a second end of the first diode.

11. The circuit of claim 10 wherein the first switch and the second switch are switched during video horizontal blanking periods.

12. The circuit of claim 10 further comprising a voltage regulator coupled to the second end of the diode.

13. The circuit of claim 10 wherein the start-up switch is a transistor.

14. The circuit of claim 10 wherein the start-up switch is controlled by an RC circuit.

15. The circuit of claim 10 further comprising:

a second diode, a first end of the second diode is coupled to the first end of the secondary winding; and a voltage regulator coupled to a second end of the second diode, wherein the start-up switch is controlled by feedback from an output of the voltage regulator.

16. The circuit of claim 10 wherein the first switch and the second switch are operated at a frequency of one half a video horizontal line rate.

17. The circuit of claim 16 wherein the second switch is operated 180 degrees out of phase with the first switch.

18. A method for synchronizing a transformer-coupled power supply with a video horizontal blanking interval comprising:

coupling an input power signal to a center of a primary winding;

coupling a first switch between a first end of the primary winding and a common node;

coupling a second switch between a second end of the primary winding and the common node;

coupling a first end of a diode to a first end of the secondary winding;

coupling a second end of the secondary winding to the common node; and coupling a start-up switch between the input power signal and a second end of the diode.

* * * * *